US012585976B2

(12) United States Patent
Zadorojniy et al.

(10) Patent No.: US 12,585,976 B2
(45) Date of Patent: Mar. 24, 2026

(54) AUTOMATED EXPLAINER OF REINFORCEMENT LEARNING ACTIONS USING OCCUPATION MEASURES

(71) Applicant: International Business Machines Corporation, Armonk, NY (US)

(72) Inventors: Alexander Zadorojniy, Haifa (IL); Michael Masin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 16/566,907

(22) Filed: Sep. 11, 2019

(65) Prior Publication Data

US 2021/0073674 A1     Mar. 11, 2021

(51) Int. Cl.
*G06N 20/00*        (2019.01)
*G06N 7/01*         (2023.01)

(52) U.S. Cl.
CPC .............. *G06N 20/00* (2019.01); *G06N 7/01* (2023.01)

(58) Field of Classification Search
CPC ........ G06N 20/00; G06N 7/005; G06N 5/045; G06N 3/006; G06N 3/063; G06N 3/08; G06N 7/01
See application file for complete search history.

(56) References Cited

U.S. PATENT DOCUMENTS

| | | | | |
|---|---|---|---|---|
| 9,836,697 | B2 * | 12/2017 | Tsitkin | G06N 7/01 |
| 2015/0019458 | A1 * | 1/2015 | Dorai | G06Q 40/06 705/36 R |

| | | | | |
|---|---|---|---|---|
| 2016/0098642 | A1 | 4/2016 | Tsitkin et al. | |
| 2017/0103267 | A1 | 4/2017 | Mishra et al. | |
| 2018/0293514 | A1 | 10/2018 | Koseki et al. | |
| 2018/0365975 | A1 * | 12/2018 | Xu | G08B 13/08 |
| 2018/0373997 | A1 | 12/2018 | Duan et al. | |
| 2019/0019080 | A1 * | 1/2019 | Claessens | G06Q 50/06 |
| 2019/0126472 | A1 * | 5/2019 | Tunyasuvunakool | G06N 3/08 |

FOREIGN PATENT DOCUMENTS

| | | |
|---|---|---|
| CN | 112488307 A | 3/2021 |

OTHER PUBLICATIONS

Sutton et al., Reinforcement Learning: An Introduction, 2014-2015, 352 pages (Year: 2015).*
Altman, Eitan, Constrained Markov Decision Processes, Aug. 1998 (retrieved on Mar. 29, 2017 from web.archive.org (https:// web. archive.org/web/20170329015304/https://www-sop.inria.fr/members/ Eitan.Altman/TEMP/h.pdf), 250 pages (Year: 1998).*
Kroon et al., Automatic Feature Selection for Model-Based Reinforcement Learning in Factored MDPs, Dec. 2009, 8 pages (Year: 2009).*

(Continued)

*Primary Examiner* — Daniel T Pellett

(74) *Attorney, Agent, or Firm* — CHIP LAW GROUP

(57)          ABSTRACT

Automatic identification of features that drive a reinforcement learning model to recommend an action of interest. The identification is based on a calculation of occupation measures of state-action pairs associated with the reinforcement learning model. High occupation measures of certain action-state pairs indicate that the states of these pairs likely include the sought-after features.

16 Claims, 2 Drawing Sheets

(56) References Cited

OTHER PUBLICATIONS

Mnih et al., Human-level control through deep reinforcement learning, Nature vol. 518 Feb. 26, 2015 pp. 529-533 and Appendix (8 pages) (Year: 2015).*

Parisi et al., Goal-Driven Dimensionality Reduction for Reinforcement Learning, 2017 IEEE/RSJ International Conference on Intelligent Robots and Systems (IROS), Sep. 24-28, 2017, pp. 4634-4639 (Year: 2017).*

Trevizan et al., Occupation Measure Heuristics for Probabilistic Planning, Association for the Advancement of Artificial Intelligence, 2017, 30 pages (Year: 2017).*

Cai et al., Adaptive Passive Mobile Sensing Using Reinforcement Learning, 2019 IEEE 20th International Symposium WoWMOM, Jun. 10-12, 2019, 6 pages (Year: 2019).*

Zadorojniy et al., Operational optimization of wastewater treatment plants: a CMDP based decomposition approach, published online Feb. 23, 2016, Springer Science+Business Media 2016, pp. 313-330 (Year: 2016).*

Mark Kroon et al., "Automatic Feature Selection for Model-Based Reinforcement Learning in Factored MDPs", 2009 International Conference on Machine Learning and Applications, 2009.

Udayan Khurana et al., "Feature Engineering for Predictive Modeling Using Reinforcement Learning", The Thirty-Second AAAI Conference on Artificial Intelligence (AAAI-18), 2018.

Volodymyr Mnih et al., "Human-level control through deep reinforcement learning", Nature, Feb. 25, 2015, vol. 518, pp. 529-533.

Anschel et al., "Averaged-DQN: Variance Reduction and Stabilization for Deep Reinforcement Learning", arXiv, Mar. 10, 2017, 13 Pages, https://arxiv.org/abs/1611.01929.

Ho et al., Generative Adversarial Imitation Learning, arXiv, Jun. 10, 2016, 14 Pages, https://arxiv.org/abs/1606.03476.

Li, "Deep Reinforcement Learning: An Overview", arXiv, Nov. 16, 2018, 85 Pages, https://arxiv.org/ abs/1701.07274.

Stoica et al., "A Berkeley View of Systems Challenges for Ai", arXiv, Dec. 15, 2017, 11 Pages, https://arxiv.org/abs/1712.05855.

The State Intellectual Property Office of People's Republic of China, "Notice of Rejection", Nov. 21, 2024, 6 Pages, CN Application No. 202010834947.8, English portions only.

The State Intellectual Property Office of People's Republic of China, "Office action,", Sep. 27, 2024, 6 Pages, CN Application No. 202010834947.8, English portions only.

Box@IBM. "ExplainableAI", retrieved from web https://ibm.box.com/s/skvgwoyjlsxzipunrowg88djvygorho1, Jan. 6, 2019, 1 page.

The State Intellectual Property Office of People's Republic of China, "The Second Office Action", Aug. 3, 2024, 29 Pages, CN Application Number-202010834947.8.

* cited by examiner

AUTOMATED EXPLAINER OF REINFORCEMENT LEARNING ACTIONS USING OCCUPATION MEASURES

BACKGROUND

The invention relates to the field of machine learning.

Machine learning is a vast field, comprised of paradigms such as supervised learning, unsupervised learning, anomaly detection, association rule learning, and reinforcement learning. The latter, reinforcement learning (RL), is gaining success in fields like robotics, industrial automation, autonomous vehicles, automated medical diagnosis and treatment, computer games, algorithmic trading, and more.

Reinforcement learning is concerned with the problem of learning a policy that can map states of an agent with respect to an environment (e.g., an autonomous vehicle's location, velocity, rangefinder readings, camera images) to agent actions (e.g., accelerating, braking, or steering the vehicle) in a sequence that maximizes some notion of cumulative reward (e.g., arriving quickly at the destination while avoiding collisions).

An extension of reinforcement learning, called deep reinforcement learning (DRL), harnesses deep neural networks to learn the model from a training set. DRL is better equipped to learn from raw, unprocessed signals (e.g., images, sensor readings, texts), and can enjoy the benefits of streamlined techniques such as end-to-end reinforcement learning.

One of the challenges of machine learning in general and reinforcement learning in particular is the need to explain the decisions of the algorithm to human users. Many machine learning algorithms make black-box predictions and decisions, thereby preventing users from learning from the insight covertly gathered by these algorithms. For instance, when a machine learning algorithm is applied to a new domain, the user will likely want to know what drives various decisions by the algorithm before fully deploying it in the field. An even bigger problem arises in regulated or mission-critical fields such as healthcare, transportation, and security, where users of machine learning systems often have to be able to explain post-factum why a certain (often mistaken) decision was made. While some techniques do exist to expose black-box operations of machine learning algorithms, a 2017 paper from the University of California, Berkeley, has still proclaimed this to be one of the major challenges to be faced by next-generation artificial intelligence systems. See Stoica, I. et al., "A Berkeley View of Systems Challenges for AI," EECS Department, University of California, Berkeley, Technical Report No. UCB/EECS-2017-159 (Oct. 16, 2017).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method which comprises: operating at least one hardware processor for automatically identifying features that drive a reinforcement learning model to recommend an action of interest, wherein said identifying is based on occupation measures of state-action pairs associated with the reinforcement learning model.

Another embodiment relates to a system which comprises: (a) at least one hardware processor; and (b) a non-transitory computer-readable storage medium having program code embodied therewith, the program code executable by said at least one hardware processor to: automatically identify features that drive a reinforcement learning model to recommend an action of interest, wherein the identifying is based on occupation measures of state-action pairs associated with the reinforcement learning model.

A further embodiment relates to a computer program product comprising a non-transitory computer-readable storage medium having program code embodied therewith, the program code executable by at least one hardware processor to: automatically identify features that drive a reinforcement learning model to recommend an action of interest, wherein the identifying is based on occupation measures of state-action pairs associated with the reinforcement learning model.

In some embodiments, the at least one hardware processor is further operated to execute the following instructions: fitting the reinforcement learning model, to generate a policy; based on the policy, calculating probabilities of the state-action pairs; based on the probabilities, calculating the occupation measures for the state-action pairs; receiving a selection of the action of interest; and selecting those of the state-action pairs which: comprise the action of interest, and have occupation measures that comply with a predefined threshold; wherein said identifying comprises identifying the features from the states of the selected state-action pairs.

In some embodiments, the predefined threshold is a predefined number of state-action pairs which have the highest occupation measures.

In some embodiments: each of the states of the state-action pairs comprises a feature vector; the identified features are from the feature vectors of the states of the selected state-action pairs; and the at least one hardware processor is further operated to execute the following instruction: reducing dimensionality of the feature vectors of the states of the selected state-action pairs according to a desired dimensionality level, such that the identified features are the most substantial features out of the feature vectors of the states of the selected state-action pairs.

In some embodiments, said reduction of dimensionality comprises performing principal component analysis (PCA) to identify a number of principal components which corresponds to the desired dimensionality level.

In some embodiments, the reinforcement learning model is a deep reinforcement learning model.

In some embodiments, the at least one hardware processor is further operated to execute the following instructions: issuing an indication of the identified features; and based on the indication, performing at least one of: (a) an action to affect a physical system in which the reinforcement learning model operates, and (b) an adjustment of the reinforcement learning model.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
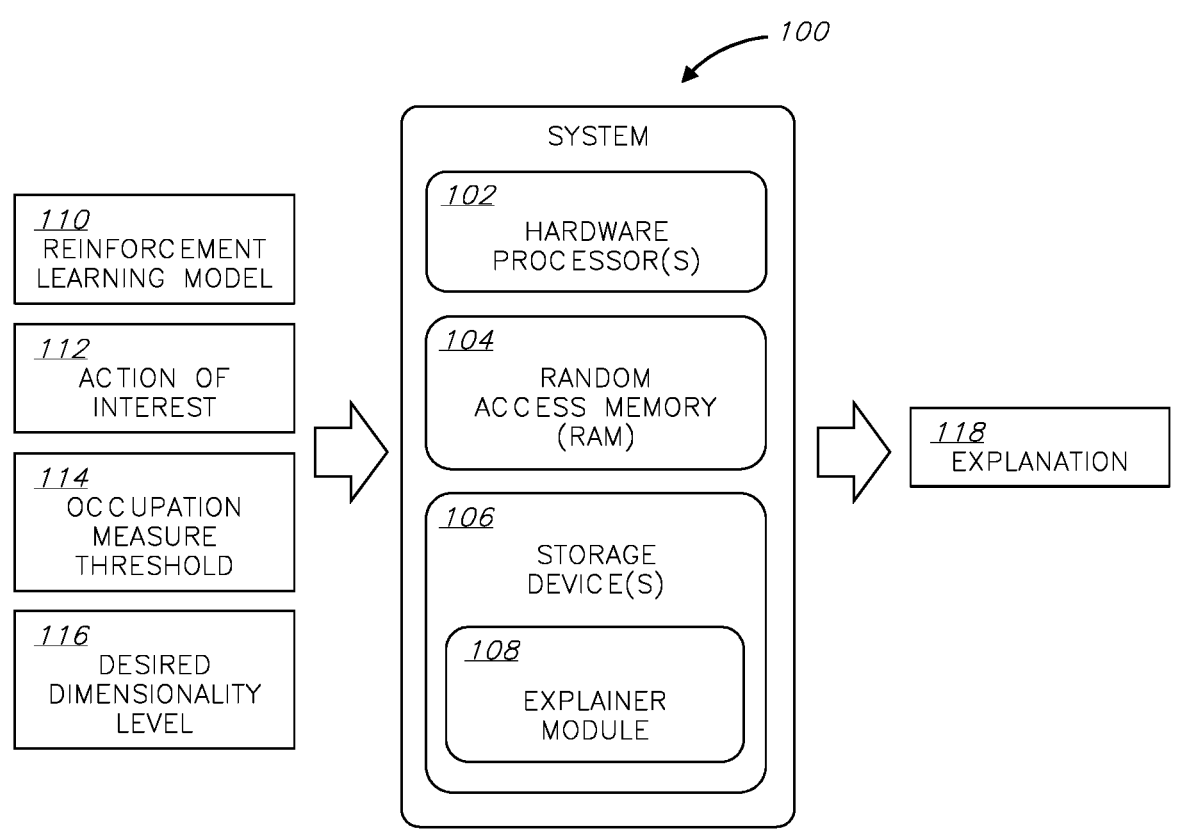
FIG. 1 is a block diagram of an exemplary system for automated explanation of reinforcement learning actions, according to an embodiment.

An automated explainer of reinforcement learning actions is disclosed herein. The explainer is a software program able to analyze a reinforcement learning model and identify what feature(s) drive the model to recommend a certain action.

Advantageously, the explainer identifies such features by employing occupation measures, which are typically used in completely different domains (such as Markov Decision Processes (MDPs)). Surprisingly, by adapting occupation measures to the reinforcement learning domain, explanation of actions recommended by a reinforcement learning model may be efficiently and accurately provided.

According to embodiments of the present invention, an occupation measure may be calculated for each state-action pair of a fitted reinforcement learning model, based on a calculated probability of that state-action pair. Thus, the occupation measures describe the time spent by the model on its various state-action pairs. To identify those features which drive an action of interest, the occupation measures of action-state pairs which include that action are consulted. High enough occupation measures of certain action-state pairs indicate that the states of these pairs likely include the sought-after features. Since, in complex systems, some states may be a high-dimensional feature vector, steps to intelligently reduce this dimensionality may also be taken. Ultimately, the explainer may be able to output a list of feature(s) to which the action of interest can be mostly attributed.

By way of example, consider a reinforcement learning model in the healthcare domain which, based on a history of medical tests, treatments, and outcomes of various favorabilities, recommends which test or treatment to perform next on a particular patient. Assume that the model has recommended that the patient undergoes immunotherapy with checkpoint inhibitors. The patient's oncologist may operate explainer to understand what particular features in the patient's history have prompted that treatment recommendation. The oncologist selects the immunotherapy recommendation as the action of interest, and optionally also sets a desired level of dimensionality in order to control the amount of features the explainer will output. The explainer then calculates occupation measures, discovers those action-state pairs with the highest occupation measures, reduces dimensionality of the states to the user-set level, and outputs an explanation that, for example, the recommendation was mainly due to a previous blood test which detected the presence of the PD-L1 biomarker. The oncologist can then read the medical literature to confirm that checkpoint inhibitors have proven successful in blocking either a cancer cell's PD-L1 protein or an immune cell's PD-1 protein, thus exposing the cancer cell to attack by the body's immune system.

As another example, an autonomous car manufacturer or a traffic collision investigator may wish to learn what sensory data collected by an autonomous car immediately prior to a fatal collision may have been misinterpreted by the car's reinforcement learning model and contributed to the accident. The car's reinforcement learning model is provided to the explainer, along with a selection of one or more of the actions taken right before the collision. The explainer then performs its calculations, and outputs an explanation that, for example, a decision not to brake or steer the car away from a pedestrian was driven by features which do not at all include a detection of a pedestrian; namely—the model did not at all detect the pedestrian. This explanation may prompt the manufacturer or investigator to inspect the car's logs (e.g., camera footage, sensor readings, output of object recognition algorithms), in which they may discover that, although the pedestrian does appear in the camera footage, it was recognized only as a lens flare artifact. The user may also run the explainer multiple times with different dimensionality settings, to explore a larger or a smaller number of features that may have been associated with the accident.

Embodiment of the present invention are further described in the following discussion of the figures.

Reference is now made to FIG. 1, which shows a block diagram of an exemplary system 100 for automated explanation of reinforcement learning actions, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as an explainer module 108. The software components may include an operating system having various software components and/or drivers for controlling and managing general system tasks (e.g., memory management, storage device control, power management, etc.), and facilitating communication between various hardware and software components.

System 100 may operate by loading instructions of explainer module 108 into RAM 104 as they are being executed by processor(s) 102. The instructions of explainer module 108 may cause system 100 to: receive a reinforcement learning model 110; receive a user selection of an action of interest 112, and optionally also of at least one of an occupation measure threshold 114 and a desired dimensionality level 116; process this input; and output an explanation 118 which includes an identification of features that drive reinforcement learning model to recommend the action of interest.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card for sending and receiving data, etc. (not shown). Components of system 100 may be co-located or distributed (e.g., in a distributed computing architecture). System 100 may reside in the user's premises, in a cloud computing environment, or in an on-premises/cloud hybrid.

Figure 2:
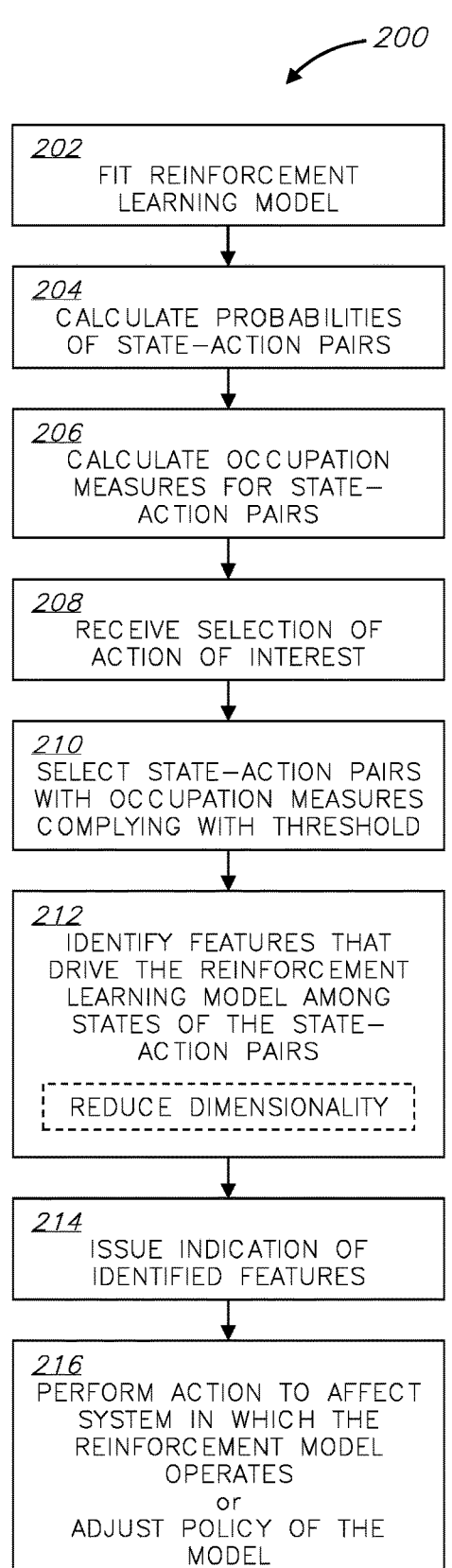
FIG. 2 is a flowchart of a method for automated explanation of reinforcement learning actions, according to an embodiment.

The instructions of explainer module 108 are now discussed with reference to the flowchart of FIG. 2, which illustrates a method 200 for automated explanation of reinforcement learning actions using occupation measures, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless a manual option is explicitly stated.

The main notations used in the following discussions are listed in the table below:

| Notation | Description | Notation | Description |
|---|---|---|---|
| s | State | π | Policy |
| S | All states | P | Probability |
| u | Action | x | Occupation measure |
| U | All actions | L | Dimensionality level (input) |
| t | Discrete time | D | Occupation measure threshold (input) |
| T | Time horizon | | |

In a step 202, a reinforcement learning model may be fitted. The reinforcement learning model is optionally a deep reinforcement learning (DRL) model. For reasons of simplicity, the abbreviated term "model" is used below.

The fitting process may include standard actions which are known in the art, such as parameter adjustment and optimization, to finally generate a policy $\pi: S \times U \to [0,1]$. The policy is a map which provides a probability P, commonly between 0 and 1, that action u will be taken when the environment in which the model operates indicates a state s: $P_{s_0}{}^\pi$ ($s=s_t|u=u_t$). The policy may be stationary (i.e., time-independent) or non-stationary (i.e., time-dependent), as known in the art.

In a step 204, based on the policy, joint probabilities of states and actions $P_{s_0}{}^\pi$ ($s=s_t$, $u=u_t$) may be calculated. Namely, a probability of every state-action pair:

$$P_{s_0}{}^\pi(s=s_t, u=u_t) = P_{s_0}{}^\pi(s=s_t|u=u_t) \cdot P_{s_0}{}^\pi(s=s_t).$$

$P_{s_0}{}^\pi(s=s_t)$ may be calculated based on historical data or simulation results.

Each state s may be defined as an N-dimensional feature (or "variable") vector at time t: $(s_t^1, s_t^2, \ldots, s_t^N)$. For example, in an autonomous vehicle, each state may be an aggregate of N sensory and ECU (Electronic Control Unit) data available at a certain discrete time.

Similarly, each action u may be defined as a K-dimensional feature (or "variable") vector at time t: $(u_t^1, u_t^2, \ldots, u_t^K)$. In the autonomous vehicle example, each action may be an aggregate of K steering, acceleration, braking, and/or signaling actions performed in response to a certain state.

In a step 206, occupation measures for the state-action pairs may be calculated, for example as:

$$x_{s_0}^\pi(s, u) = \frac{1}{T} \cdot \sum_{t=[0,T]} P_{s_0}^\pi(s = s_t, u = u_t).$$

Namely, this calculation may be based on the state-action pair probabilities calculated in step 204. The occupation measure for each state-action pair is therefore representative of the frequency, between 0 and 1, at which that state-action pair was visited. It may optionally be estimated during the fitting process of step 202.

The occupation measure may alternatively be formulated with a discount factor β (to discount future rewards) and an infinite horizon, as these two elements are known in the art: $x_{s_0}{}^\pi(s,u) = (1-\beta) \cdot \Sigma_{t=\{0,T\to\infty\}} \beta^t \cdot P_{s_0}{}^\pi(s=s_t, u=u_t)$.

In a step 208, a selection of an action of interest $u^i$ may be received. This may be a manual selection by a user of method 200, to define which action is to be explained. Selecting the action of interest may be facilitated by presenting to the user a list of actions of the particular model, from which the user can conveniently choose. Alternatively, the user may manually type a computer-readable identification of the action of interest.

The user's selection may be motivated, for example, by inspecting logs of a system operating the model (e.g., an autonomous car which logs its sensory data, ECU messages, object recognition algorithm output, etc.), locating a point in time where an event of interest has occurred (e.g., a collision), and correlating action(s) performed by the system at that particular time with action(s) of the model.

Alternatively, the selection may be made automatically, in response to an automatically-generated indication of a triggering event which has been pre-programmed to initiate execution of method 200. For example, the triggering event may be a collision detected by an autonomous vehicle, or an adverse reaction to treatment recorded in a patient's electronic medial file. Such events are likely to require later human analysis or investigation, so there is an advantage to analyze them immediately and automatically, and present the user with a ready-made explanation. In such scenarios, the system operating the model (e.g., an autonomous vehicle, robot, industrial automation controller, etc.) may also be the one executing method 200, and the explanation is then transmitted to the user over a computer network, such as a Local-Area Network (LAN) or a Wide-Area Network (WAN). Alternatively, the system operating the model may transmit (e.g., over LAN or WAN) all data required for the execution of method 200 to a separate computer system such as system 100 of FIG. 1, where the execution occurs.

In a step 210, specific ones of the state-action pairs may be selected—those which comprise the action of interest and have occupation measures that comply with a predefined threshold D, such as the D pairs (D≥1) having the highest occupation measures: $x_{s_0}{}^\pi(s, u^i)|_D$. These D pairs are likely to include the states with the features that drive action $u^i$ in the most significant manner. The threshold may either be manually provided by the user or be hard-coded based on experimental results which confirm what threshold will likely be beneficial for a typical user.

The threshold may alternatively be defined not as an absolute number of highest occupation measures, but rather as a percentile of occupation measures or as a lower bound of occupation measure values above which all occupation measures are selected.

In a step 212, features that drive the reinforcement learning model to recommend action $u^i$ may be identified from among the states of the selected state-action pairs (e.g., the D pairs). Recalling that each state is a feature vector $(s_t^1, s_t^2, \ldots, s_t^N)$, the features of the states of the selected state-action pairs effectively form a D×N matrix (or D×N+1 if the occupation measure is also included in the matrix).

In a simplistic scenario, the features identified in step 212 are simply all N features in the D×N matrix. This might suit cases in which the number of identified features is rather small, such as 1-10 features, or when the user explicitly requires to see the full list of features. However, many scenarios involve models operating in complex environments, and therefore the feature vectors may be of a very high dimensionality. Simply providing the user with a long list of features (e.g., tens or hundreds of features) might not be considered a proper explanation of why action $u^i$ was recommended by the model. Accordingly, step 212 may additionally include an act of intelligently reducing the number of identified features to the most substantial ones, by reducing the dimensionality of the feature vectors.

A desired level of dimensionality L may either be manually received by the user, or hard-coded based on experimental results which confirm what level will likely be beneficial for a typical user. Then, the dimensionality of $x_{s_0}^\pi(s,u^i)|_D$ may be reduced from N to L by applying any dimensionality reduction technique known in the art, such as Principal Component Analysis (PCA), Linear Discriminant Analysis (LDA), or Generalized Discriminant Analysis (GDA), to name a few examples. This outputs the L most significant features. For instance, if PCA is applied to the feature vectors, only the first L principal components may serve as the output.

In a step 214, an indication of the identified features (either all N features from the D×N matrix, or the fewer L features) may be issued. This may include, for example, displaying the identified features on a computer display—either only the names of the features or also their underlying data (e.g., image, data matrix, source code, etc.). As another example, the indication may be issued by transmitting it to the user as an electronic message over a computer network; this is particularly useful if step 208 included an automatic selection of the action of interest based on a triggering event, and the user was not the one initiating method 200. A further example is transmitting the indication to another computer system, over a computer network, as a structured message; this may be performed, for example, by interfacing with an Application Programming Interface (API) of the other computer system and transmitting the message per the API's definitions.

An optional step 216 includes performing one or more actions to affect a physical system in which the model operates, based on the issued indication. The one or more actions may be automatically selected and instructed based on a predefined rule set which maps possible identified features with actions. The actions may be instructed to the pertinent system by sending it a structured message, such as via an API thereof, over a computer network. For example, when the system in which the model operates is an autonomous vehicle, the rule set may define that if one of the identified features is an image-based feature captured by a certain camera, then the vehicle should be instructed to disable that camera and switch to a backup camera, or to stop providing features of that type to the model (if the model's policy is trained to react to states that lack that type of features, the model will continue operating as it was designed to). Similar rules may apply to other systems, such as a robotic system, an industrial automation controller, etc. The rationale behind such rules is that if analysis of a certain action of interest was performed (and possibly also initiated automatically by a triggering event, as discussed above), this indicates that the action of interest is unfavorable, and the feature(s) relied on by the model to recommend that action might have been acquired by a faulty sensor, or the particular feature extraction algorithm (e.g., an object recognition algorithm) has provided incorrect output.

Additionally or alternatively, optional step 216 may include adjusting the model's policy based on the issued indication, to improve the way the model reacts to similar features in the future. For example, if the model is part of an automated medical diagnosis and treatment system, and the action of interest was a certain treatment which caused severe adverse effects, then the policy may be updated with a substantial negative reward for the state-action pair which included that action, and/or the discount factor for that state-action pair may be substantially lowered in order to immediately penalize it. This can be regarded as a type of additional training based on explicit new information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

operating at least one hardware processor for:

receiving a reinforcement learning model;

generating a policy for the reinforcement learning model;

calculating, based on the generated policy, joint probabilities of a plurality of state-action pairs, wherein each joint probability of the joint probabilities is associated with a respective state-action pair of the plurality of state-action pairs;

calculating, based on the calculated joint probabilities, a plurality of occupation measures for the plurality of state-action pairs, wherein each occupation measure, of the plurality of occupation measures, indicates a frequency of visit of the reinforcement learning model on a respective state-action pair of the plurality of state-action pairs;

receiving automatically, based on a trigger event, an action of interest, wherein the action of interest corresponds to a recommended action, from the reinforcement learning model, to be performed by a system;

selecting specific state-action pairs of the plurality of state-action pairs, wherein the specific state-action pairs comprise the action of interest, the specific state-action pairs have specific occupation measures, of the plurality of occupation measures, that comply with a predefined threshold, and the specific state-action pairs have higher relevance, among the plurality of state-action pairs, based on the specific occupation measures that comply with the predefined threshold;

identifying specific features from the selected specific state-action pairs, wherein the identified specific features correspond to the action of interest;

reducing a number of the identified specific features based on reduction of dimensionality of feature vectors associated with a corresponding specific state of the specific state-action pairs, wherein the reduction of dimensionality of the feature vectors comprises performing principle component analysis (PCA) to identify a number of principle components that corresponds to a desired dimensionality level;

issuing an indication of the reduced number of the identified specific features, wherein the indication is an electronic message to be sent over a computer network; and disabling a function of a first sensor of the system, based on the issued indication.

2. The computer-implemented method according to claim 1, wherein the predefined threshold is a predefined number of the specific state-action pairs, of the plurality of state-action pairs, which have highest occupation measures among the plurality of occupation measures.

3. The computer-implemented method according to claim 1, wherein the reduced number of the identified specific features are most substantial, among the identified specific features.

4. The computer-implemented method according to claim 1, wherein the reinforcement learning model is a deep reinforcement learning model.

5. The computer-implemented method according to claim 1, further comprising:

issuing, based on the issuing of the indication to disable the function of the first sensor, a command to switch to a second sensor, wherein the second sensor is configured to collect sensor data associated with the identified specific features.

6. A system, comprising:

at least one hardware processor; and a non-transitory computer-readable storage medium having program code embodied therewith, the program code executable by the at least one hardware processor to:

receive a reinforcement learning model;

generate a policy for the reinforcement learning model;

calculate, based on the generated policy, joint probabilities of a plurality of state-action pairs, wherein each joint probability of the joint probabilities is associated with a respective state-action pair of the plurality of state-action pairs;

calculate, based on the calculated joint probabilities, a plurality of occupation measures for the plurality of state-action pairs, wherein each occupation measure, of the plurality of occupation measures, indicates a frequency of visit of the reinforcement learning model on a respective state-action pair of the plurality of state-action pairs;

receive automatically, based on a trigger event, an action of interest, wherein the action of interest corresponds to a recommended action, from the reinforcement learning model, to be performed by a system;

select specific state-action pairs of the plurality of the state-action pairs, wherein the specific state-action pairs comprise the action of interest, the specific state-action pairs have specific occupation measures, of the plurality of occupation measures, that comply with a predefined threshold, and the specific state-action pairs have higher relevance, among the plurality of state-action pairs, based on the specific occupation measures that comply with the predefined threshold;

identify specific features from the selected specific state-action pairs, wherein the identified specific features correspond to the action of interest;

reduce a number of the identified specific features based on reduction of dimensionality of feature vectors associated with a corresponding specific state of the specific state-action pairs, wherein the reduction of dimensionality of the feature vectors comprises performing principle component analysis (PCA) to identify a number of principle components that corresponds to a desired dimensionality level; and train, based on the reduced number of the identified specific features, the reinforcement learning model, wherein the training includes updating the policy of the reinforcement learning model with a negative reward for a first state-action pair of the selected specific state-action pairs.

7. The system according to claim 6, wherein the predefined threshold is a predefined number of the specific state-action pairs, of the plurality of state-action pairs, which have highest occupation measures among the plurality of occupation measures.

8. The system according to claim 6, wherein the reduced number of the identified specific features are most substantial, among the identified specific features.

9. The system according to claim 6, wherein the reinforcement learning model is a deep reinforcement learning model.

10. The system according to claim 6, wherein the program code is further executable by the at least one hardware processor to issue an indication of the reduced number of the identified specific features.

11. The system according to claim 1, wherein the training further includes updating the policy of the reinforcement learning model with a lower discount factor for the first state-action pair of the selected specific state-action pairs.

12. The system according to claim 6, wherein the program code is further executable by the at least one hardware processor to train the reinforcement learning model using a neural network, and the reinforcement learning model is a deep reinforcement learning model.

13. A computer program product comprising a non-transitory computer-readable storage medium having program code embodied therewith, the program code executable by at least one hardware processor to:

receive a reinforcement learning model;

generate a policy for the received reinforcement learning model;

calculate, based on the generated policy, joint probabilities of a plurality of state-action pairs, wherein each joint probability of the joint probabilities is associated with a respective state-action pair of the plurality of state-action pairs;

calculate, based on the calculated joint probabilities, a plurality of occupation measures for the plurality of state-action pairs, wherein each occupation measure, of the plurality of occupation measures, indicates a frequency of visit of the reinforcement learning model on a respective state-action pair of the plurality of state-action pairs;

receive automatically, based on a trigger event, an action of interest, wherein the action of interest corresponds to a recommended action, from the reinforcement learning model, to be performed by a system;

select specific state-action pairs of the plurality of state-action pairs, wherein the specific state-action pairs comprise the action of interest, the specific state-action pairs have specific occupation measures, of the plurality of occupation measures, that comply with a predefined threshold, and the specific state-action pairs have higher relevance, among the plurality of state-action pairs, based on the specific occupation measures that comply with the predefined threshold;

identify specific features from the selected specific state-action pairs, wherein the identified specific features correspond to the action of interest;

reduce a number of the identified specific features based on reduction of dimensionality of feature vectors associated with a corresponding specific state of the specific state-action pairs, wherein the reduction of dimensionality of the feature vectors comprises performing principle component analysis (PCA) to identify a number of principle components that corresponds to a desired dimensionality level; and train, based on the reduced number of the identified specific features, the reinforcement learning model, wherein the training includes updating the policy of the reinforcement learning model with a lower discount factor for a first state-action pair of the selected specific state-action pairs.

14. The computer program product according to claim 13, wherein the predefined threshold is a predefined number of the specific state-action pairs, of the plurality of state-action pairs, which have highest occupation measures among the plurality of occupation measures.

15. The computer program product according to claim 13, wherein the reduced number of the identified specific features are most substantial, among the identified specific features.

16. The computer program product according to claim 13, wherein the reinforcement learning model is a deep reinforcement learning model.

* * * * *